Dec. 23, 1958  H. LÉONARD  2,865,101
DENTAL ENGINE HEAD ASSEMBLY
Filed July 12, 1957
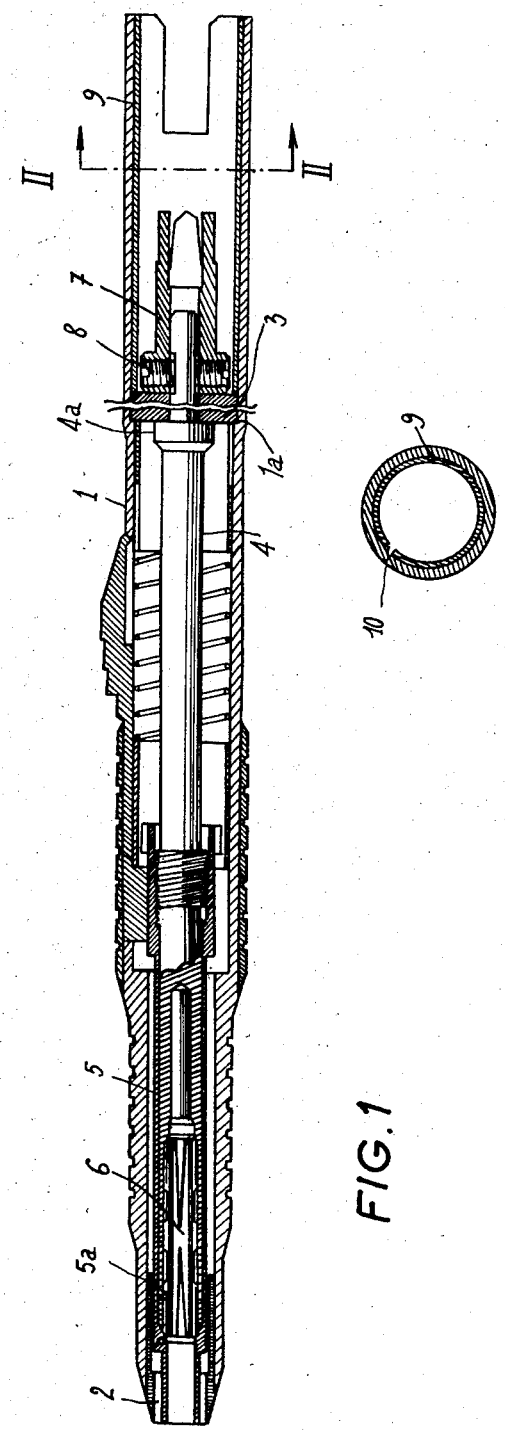
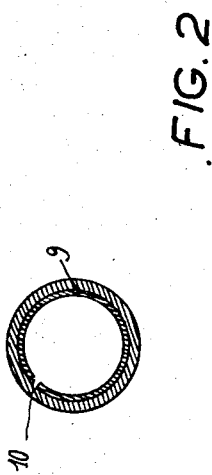
FIG.1
FIG.2

United States Patent Office 2,865,101
Patented Dec. 23, 1958

2,865,101

DENTAL ENGINE HEAD ASSEMBLY

Henri Leonard, Besancon, France, assignor to ETS. Garnier & Fils, Besancon, France, a French company Application July 12, 1957, Serial No. 671,482

Claims priority, application France July 17, 1956

2 Claims. (Cl. 32—26)

This invention relates to mechanical tools used in dental surgery and particularly to an improved head assembly or handpiece for supporting a rotary tool from a dental engine.

Conventional assemblies of this kind generally comprise a tubular body having a spindle or shaft coaxially journalled in spaced bearings in the body, said body at one end being adapted to be coupled to the extensible arm of the dental engine for driving the spindle in high-speed rotation from said engine, while the opposite end of the spindle supports a chuck or gripper in which the rotary dental tool, e. g. a drill, burr, or the like, is adapted to be removably gripped. Since the assembly has to be easy to dismantle, it was heretofore found necessary either to provide the body in a plurality of separable sections, or in other types this undesirable condition was avoided by providing the rearmost spindle bearing in the from of a removable abutment, which was adapted to be retained in its normal assembled position by means such as a spring latch or a threaded ring or bush screwable over the body. This latter construction tends to increase undesirably the complication of the machining process and the use of a spring latch closure is relatively unreliable while the use of a screwed closure renders the dismantling and reassembly operations relatively long and tedious.

Objects of this invention include the provision of an improved dental engine head assembly having a body of simplified unitary construction, and with a spindle being supported in the body by a rear bearing which is instantly removable and repositionable and, when repositioned, will be retained in a perfectly reliable manner.

In a dental head assembly or handpiece according to the invention, the rearmost bearing of the rotary spindle abuts, at its forward side, against stop means, such as, an internal shoulder in the tubular body, and is retained in position by a slotted, resilient spacer or retainer sleeve slidably fitted in the body and normally having its rear end flush with the rear end of the body.

An exemplary embodiment of the invention will now be described by way of illustration but not of limitation with reference to the accompanying drawing wherein:

Fig. 1 is an axial section of an improved dental head, and

Fig. 2 is a cross section on line II—II of Fig. 1.

In the illustrated embodiment of the invention the dental head is of the type adapted to be coupled to a wrist-joint type of dental engine drive.

The head assembly includes a generally tubular body 1 having a front bearing 2 and a rear bearing 3 supported in it for rotatably supporting a rotary shaft 4. While sleeve bearings have been shown it will be understood that either or both of the bearings 2 and 3 may be ball bearings. The spindle or shaft 4 has a recessed front section to receive a two-jaw chuck or gripper 6 operable to a gripping condition and to a releasing condition in which a dental tool (not shown), such as, a drill or burr, is respectively mounted on and released from the spindle.

The chuck or gripper 6 is operated between its gripipng and releasing conditions by a system comprising a forwardly tapered sleeve 5 surrounding the spindle 4 and having threaded engagement with said spindle so that relative rotation between the sleeve 5 and spindle 4 produces relative axial displacement between the spindle and sleeve which acts through the mating taper portions 5a to move the gripper between its gripping and releasing conditions. Secured to the rear end of the spindle 4, as by screws 8, is a driver coupling 7. When the slotted rearward projecting portion of the tubular body 1 is coupled with the wrist-joint of the dental engine, the driver coupling is simultaneously engaged by a driver shaft in the wrist-joint for effecting the high speed rotation of the shaft 4 and the tool gripped in the chuck 6.

In accordance with the present invention, the rear bearing 3 has its front side peripherally abutted against an internal shoulder 1a formed in the body 1, while the rear side of bearing 3 peripherally abuts against a retainer sleeve or liner 9 fitted into the rearwardly projecting end part of the body. The length of the sleeve 9 is selected so that its rear end edge will be flush with that of the body. The spindle 4 has a boss or flange 4a formed on it to engage the front side of the bearing 3 and the driver member 7 may be mounted on the rear end of the spindle so as to engage substantially the rear face of the bearing 3. As shown in Fig. 2, the spacer or retainer sleeve 9 is preferably slotted for resiliency as at 10. It will be seen that when the above described dental head is coupled to the wrist-joint (or other suitable drive system of a dental engine), the retainer sleeve 9 is firmly held in position within the body thereby blocking the bearing 3 in position against the shoulder 1a.

In order to dismantle the dental head, the latter is uncoupled from the wrist joint and the spindle 4 is forced rearwards, for example, by exerting pressure upon the drill gripped in the chuck at the front end of the spindle. The flange 4a of the spindle then forces the assembly consisting of the bearing 3, retainer sleeve 9 and driver 7 rearwardly with respect to the body 1 so that the rear end portion of the sleeve is exposed and the sleeve 9 may be quickly pulled out completely.

It will be understood that various changes may be made in the details of the construction illustrated herein without exceeding the scope of the invention.

What I claim is:

1. A dental head assembly comprising a tubular body having a coupling extension at its rear end engageable with coupling means on a dental engine, a spindle extending coaxially in said body, gripper means at the front end of the spindle for releasably gripping a dental tool, driver means at the rear end of the spindle engageable with driving means on the dental engine when said body is coupled to the latter, a front bearing in said body for rotatably supporting the spindle in the body adjacent the front end thereof, a rear bearing for rotatably supporting the spindle in the body adjacent the rear end of the spindle, internal shoulder means in the body engageable by the front side of said rear bearing, and a retainer sleeve which is slotted for radial resiliency and fitting in said body for engagement of the front end of the sleeve with the rear side of the rear bearing, the rear end of the sleeve being engageable with the coupling means of the dental engine when said body is coupled to the dental engine so that the coupling means retains the rear bearing in position against said shoulder means.

2. A dental head assembly comprising a tubular body having a coupling extension at its rear end engageable with coupling means on a dental engine, a spindle extending coaxially in said body, gripper means at the front end of the spindle for releasably gripping a dental tool, driver means at the rear end of the spindle engageable with driving means on the dental engine when said body is coupled to the latter, a front bearing in said body for rotatably supporting the spindle in the body adjacent the front end thereof, a rear bearing for rotatably supporting the spindle in the body adjacent the rear end of the spindle, internal shoulder means in said body engageable by the front side of said rear bearing, a retainer sleeve slidably fitting in said body for engagement of the front end of said sleeve against the rear side of said rear bearing, the rear end of said sleeve being engageable with the coupling means of the dental engine when said body is coupled to the latter so that the coupling means then retains the rear bearing against said shoulder means, and a flange on said spindle engageable with the front side of said rear bearing, whereby an axial force exerted rearwardly on said spindle when said body is uncoupled from the dental machine will force said rear bearing and retainer sleeve out of said body.

References Cited in the file of this patent

UNITED STATES PATENTS 2,666,259    Thau-Jensen ------------ Jan. 19, 1954